UNITED STATES PATENT OFFICE 2,146,417

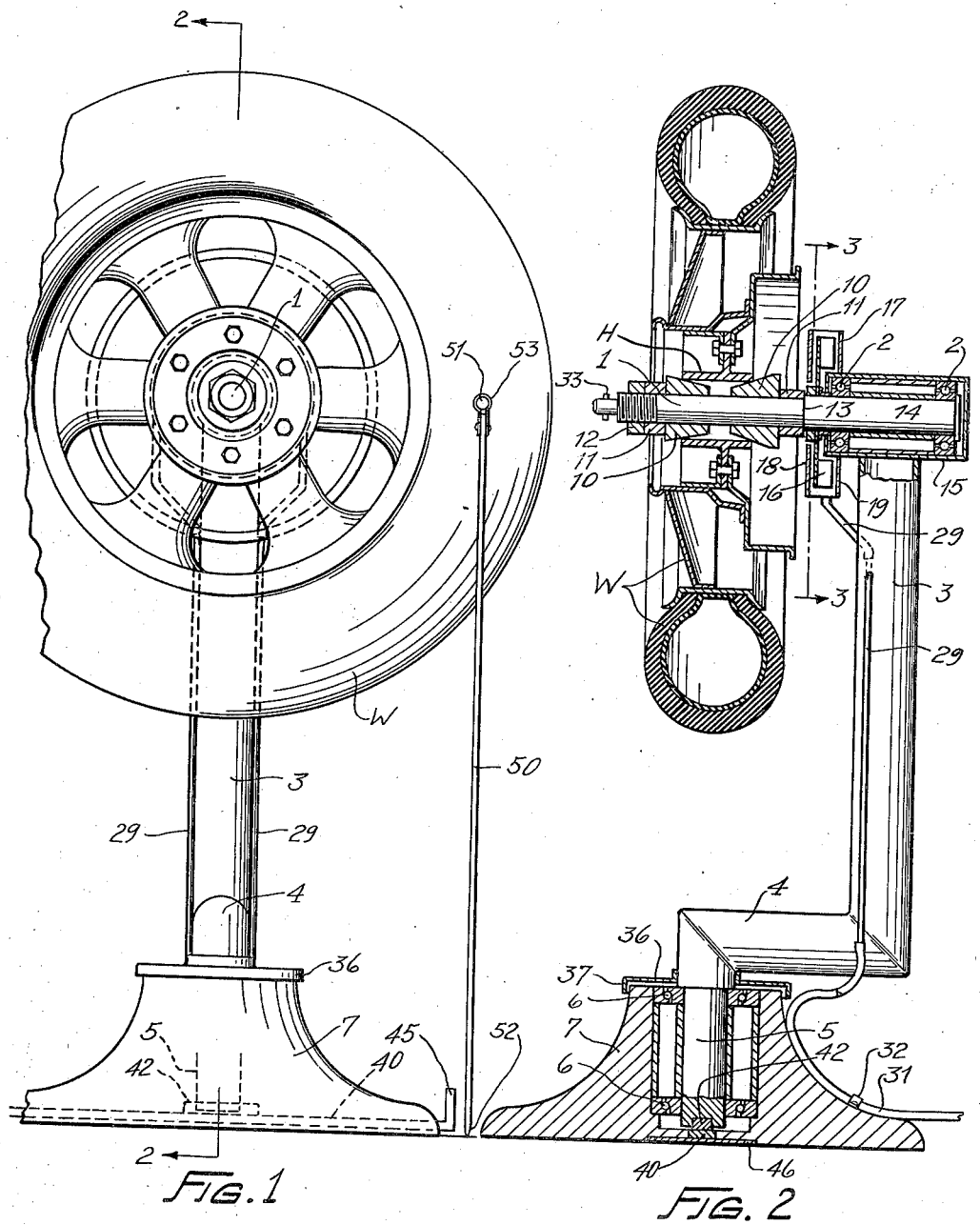

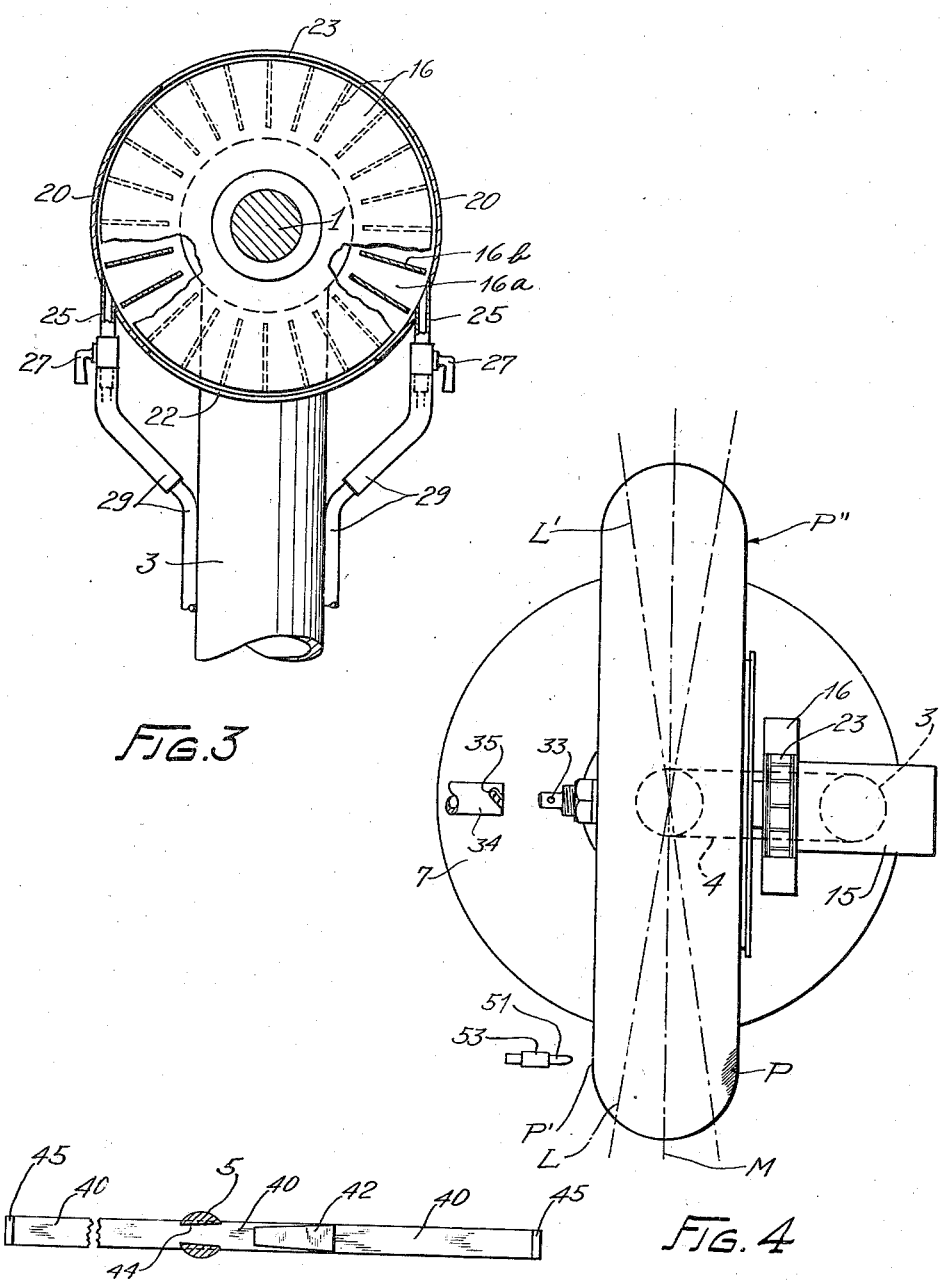

MACHINE FOR TESTING THE DYNAMIC BALANCE OF WHEELS

William A. Catalano, Shaker Heights, Ohio

Application February 1, 1937, Serial No. 123,371

12 Claims. (Cl. 73—51)

This invention relates to a method and machine and apparatus for testing the balance or unbalance of wheels, such as pneumatically tired, automobile wheels. More especially, the invention relates to testing both the static and dynamic balance of such wheels.

Static unbalance, as is well known, results from non-coincidence of the center of gravity with the geometric center of the wheel, while dynamic unbalance results from inequality of weight distribution in planes normal to the turning axis, particularly such planes as are offset from the median plane of the wheel. Usually, when the tires are mounted on the wheels of a new automobile, at the factory, the wheels are properly balanced, both statically and dynamically. However, after repairs have been made to a tire, the same may not be replaced on the wheel in the same position which it originally occupied, resulting, in many cases, in unbalance, irrespective of material added or subtracted in making the repairs. The present invention has, as one of its objects, the provision (as for use by service stations, garages, etc.), of a simple and effective method and apparatus for determining whether or not automobile wheels are unbalanced, whereby to enable appropriate corrective measures to be taken when required.

Due to the high driving speeds permitted by present-day automobile design and improvements in roadways, the running or dynamic balance of the road wheels is of great importance from the standpoint of safety. In the event of dynamic unbalance, the wobbling condition known as "shimmying" frequently results, and, when once started, this usually continues until the car is greatly slowed down. During such shimmying the steering gear of the car may be damaged or accidents may result merely from the unmanageability of the steering apparatus, while the condition obtains. Static unbalance may also cause shimmying, although it is less apt to, and while the determination and correction of static unbalance can be effected without any special apparatus, other than means for mounting the wheel so that it may be turned freely on its axis, (noting whether it always comes to rest in the same position), dynamic unbalance is less easily found and much more important from the standpoint of preventing shimmying of the wheels when in use on the car.

More specific objects of the invention include the provision of a simple mechanism for mounting and operating an automobile wheel in a manner permitting simple and effective testing of the same for unbalanced conditions; the provision of a machine which may be operated to test both the static and dynamic unbalance of wheels; and the provision of a simple power drive and braking means for a wheel in testing position on such machine.

Other objects and features of the invention will become apparent from the following description, relating to the accompanying drawings which show a preferred form of machine and indicate the method of testing, which may be carried out partly or wholly by the machine. The essential characteristics are summarized in the claims.

Referring generally to the drawings, Fig. 1 is a front view of the machine, with an automobile wheel mounted thereon; Fig. 2 is a vertical assembly view of the machine, taken on a plane substantially as indicated at 2—2 on Fig. 1; Fig. 3 is a sectional detail view, taken as indicated by the line 3—3 on Fig. 2; Fig. 4 is a diagrammatic plan view, illustrating the relationship of parts when the wheel is mounted and also indicating the method of testing the wheel for unbalance, and Fig. 5 is a plan view of a latching device which may be incorporated in the base of the machine.

Referring further to the drawings, 1 indicates a horizontal spindle on which a wheel W is suitably mounted as by means of its hub, the spindle being preferably carried in free running bearings 2 (ball-bearings for example), on top of an upright standard 3, the lower end of which is offset at 4 to form in effect a crank arm. The vertical pin 5 of the arm is supported in free running bearings 6 (also ball-bearings, as shown), on a pedestal or base 7, adapted to be set on a horizontal surface, or be secured fixedly thereto, as desired. The axis of the pin 5 is substantially in line with the median transverse plane of a wheel when properly mounted on the spindle 1, so that the wheel supported on the spindle may oscillate freely in a horizontal plane, about its center, if it tends to, due to unbalance.

Referring more specifically to the mechanism shown, the mounting for the wheel on the spindle 1 may comprise a pair of cones 10, adapted to enter the opposite ends of the wheel hub H, and center it on the spindle. The cones are adjustably mounted on the spindle as between removable and replaceable sleeves 11, the outer one of which is engaged by a fastening nut 12. The sleeves of a complete set may be of various lengths, so that various types of wheels may be mounted in the desired positions to dispose their median planes approximately in line with the axis of the pin 5. The nut 12 is tightened until the inner sleeve 11 is pressed against a shoulder 13 adjacent an enlarged cylindrical portion 14 of the spindle, which portion enters the bearings 2.

The bearings 2 may be appropriately spaced and secured in a housing 15, rigidly secured to the top end of the standard 3, and are designed for radial thrust only, as shown.

An appropriate means for turning and/or braking the spindle may comprise a fluid motor operatively associated with a wheel when mounted in testing position. As shown in Figs. 2 and 3, there is a vaned rotor 16, in a casing 17. The rotor may comprise a sheet-metal disc 16a, suitably clamped or fastened to the spindle and having a radial arrangement of blades 16b projecting from one side, as shown in Fig. 3. The rotor casing 17 has end walls 18 and 19 (sheet-metal discs, as shown), one disc being secured to the housing 15, and the two being connected by arcuate wall members 20, near their peripheries. The walls 20 are separated circumferentially to provide bottom and top free passages for air, as at 22 and 23.

Since there is always a supply of air around a tire service station or garage, air may be piped from such supply directly to the motor 16, and led into the rotor casing through jet tubes, such as 25, (Fig. 3). The inner ends of the tubes are directed tangentially against the blades 16b. By using two such jet tubes, one may supply air for spinning the wheel and also for braking, simply by reversing the direction of application of air on the vanes.

The used air applied in spinning or braking is exhausted through the upper free passage 23 and the lower passage 22 prevents drag on the blades incident to back pressure.

Each air line may be provided with an appropriate valve (shown for convenience at 27 associated with the jet tubes 25) and any suitable arrangement of air conduits, such as indicated at 29, may be fastened to the machine, as by welding or by means of clips, such as indicated at 32 on the base. The lower sections 31 of the conduits are preferably flexible, as by being made of rubber, so that the crank portion 4 of the standard may oscillate freely a predetermined amount, as necessitated by the maximum expected wobble of a wheel mounted on the spindle.

An auxiliary arrangement for driving the wheel may comprise means on the spindle which is engageable with a crank or other driving device such as may be mounted on an electric drill. Figs. 2 and 4 show a reduced extension provided with a cross pin 33, adapted to be drivingly engaged by a sleeve 34 having a pair of inclined driving slots 35 at its end to engage the cross pin. Such sleeve may have a crank formed on it, for turning of the wheel by hand, or may be mounted in the usual chuck of a portable power drill.

The bearings for supporting the crank pin 5 in the base may comprise an appropriate arrangement of vertical thrust-bearing assemblies suitably spaced as by sleeves. A dust cap 36 may overlie the upper bearing 6 and have a downwardly turned flange 37 loosely surrounding the upper portion of the base.

When using the machine for testing static balance of wheels (or in making adjustments for unbalance, as described below), it is inconvenient to have the wheel swing horizontally. To prevent this a latch may be provided in connection with the base 7, which latch operatively engages a portion of the standard or the crank arm thereof. As shown the latch comprises a bar 40 slidably mounted in the base, as in a horizontal groove in the bottom of the base; the bar having a wedge shaped projection 42 adapted to engage a similarly shaped cross groove 44 in the bottom end of the crank pin 5. The bar has upwardly bent ends 45 by which the attendant may kick the bar to latching and unlatching position with either foot. The bar may be held in position in the bottom groove of the base by a plate 46 or straps secured to the base in underlying relationship to the bar.

A suitable device for indicating, on a wheel mounted on the machine, the position of its unbalanced region, may comprise a staff 50, held in a definite relationship, e. g., to the tire; the staff carrying a stylus or marker 51. Such staff may be held in the operators hand with the lower pointed end 52 resting on the ground or floor adjacent the base. The upper end of the staff may have securing means for the stylus, such as a clasp 53, and the stylus may be a piece of chalk. The marker could, of course, be adjustably mounted directly on the base 7 in suitable fashion.

Referring particularly to Figs. 1 and 4, it will be seen that when the wheel is mounted on the spindle, the free bearing for the spindle permits the wheel to be tested for static unbalance simply by noting if the wheel, when turned, comes to rest each time with the same portion down. Appropriate measures can then be taken to balance the wheel by removing the excess on one side or compensating for it by counter-weighting the opposite side of the wheel or tire, directly opposite the heavy part.

Now, when the wheel is rotated rapidly, as by means of the motor 16, or by other appropriate means, if the wheel is in dynamic balance, the spindle 1 will rotate on a stationary axis. If, on the other hand, the wheel is unbalanced on either side of the median plane, the unbalanced portion will tend to approach this plane twice for each revolution, as is diagrammatically shown in Fig. 4. Fig. 4 shows, by cross-hatching, at P, an unbalanced weight at one side of the tire. Such may be formed as by a heavy layer of rubber placed therein repairing the tire. This heavy point, as shown, is opposite the position of the stylus. Now, as the wheel is turned rapidly, the heavy region will tend to become displaced toward the normal position of the median plane of the wheel (see line M), thereby shifting such plane toward the position indicated by the broken line L. The wheel will actually move bodily in this direction, due to its free pivot at 5, in alignment with its median plane. When the heavy part reaches a position opposite the stylus with reference to the spindle, there will be a tendency for the heavy portion P to displace the wheel toward the broken line L'. In other words, the wheel will wobble, and the position of the weighted region will be indicated by the stylus placing a mark on the casing opposite said region or at P'. Appropriate correction of the unbalanced condition can then be made by applying counter-weighting material, such as a patch of rubber on the tire over the mark made by the stylus, i. e., directly opposite the weighted portion, and also (an equivalent weighting) 180 degrees from the mark made by the stylus, but on the opposite side of the tire from the mark (as at P"), and such correction will not disturb the static balance of the wheel, assuming it is statically balanced to start with. The corrective weighting can also be applied to the wheel as by clips (already on the market for this purpose) which clips may be attached directly to the wheel rims under the tire casings and held in place by such casings.

I claim:

1. A balance tester for wheels, comprising a freely rotatable spindle having means to clamp the wheel thereon, and a support for the spindle which is mounted to oscillate about an axis lying substantially in the median transverse plane of the wheel when in place on the spindle.

2. A balance tester for wheels, comprising a substantially horizontal freely rotatable spindle having a projecting portion which carries the wheel for rotation on its axis, said spindle being mounted to rock freely about a substantially vertical axis all portions of which are fixed and which extends normal to the rotational axis of the wheel.

3. A balance tester for wheels, comprising a rotatably arranged substantially horizontal spindle adapted to carry a wheel, means arranged to clamp and center such wheel on the spindle, said spindle being mounted to rock freely about a substantially vertical axis located approximately in the median plane of the wheel and intersecting the axis of the spindle.

4. A balance testing machine for automobile wheels comprising a base, a standard having an arm pivoted to the base so that the arm and standard may oscillate about a vertical axis, and a horizontal spindle having a free end projecting from the standard substantially in vertical alignment with the arm and upon which a wheel to be tested may be rotatably mounted substantially over the pivot axis of said arm.

5. A balance testing machine, comprising a spindle on which a wheel to be tested is adapted to be mounted, a motor connected with the spindle to spin the wheel, and a pivotal support for the spindle, the axis of which is substantially coincident with the median plane of the wheel when properly mounted on the spindle.

6. A balance testing machine, comprising a spindle on which a wheel to be tested is adapted to be mounted, a set of vanes permanently connected with the spindle to turn therewith, means for directing fluid against the vanes in a manner to turn the spindle, impositively, so as to permit static balance testing without interference by the driving means, and an oscillatable support for said spindle, the axis of which is normal to the spindle axis.

7. A balance testing machine for wheels, comprising means to mount a wheel so that it may spin freely on a horizontal axis, and an oscillatable support for the mounting means, comprising a standard having an arm reaching under the wheel in its mounted position, and a base in which the arm has a free vertical pivot which constrains the arm to movement on an axis all portions of which are fixed.

8. A balance testing machine for wheels, comprising means to mount a wheel so that it may spin freely on a horizontal axis, an oscillatable support for the mounting means, comprising a standard having an arm reaching under the wheel in its mounted position, a base in which the arm has a free vertical pivot and a latching bar having means to engage a portion of the arm to hold the arm stationary on the base.

9. A machine of the character described, comprising a base, an upright standard having at its lower end a crank arm with its crank pin mounted in a vertical bearing in said base, means to mount a wheel for rotation on the upper portion of the standard, an air motor operatively associated with such wheel, when so mounted, for rotating the wheel, a conduit extending upwardly along the standard for supplying air to the motor and a flexible hose adapted to supply air to the conduit.

10. A machine of the character described, comprising a base, a standard having an upright portion and a crank arm portion, the arm having a downwardly extending extreme portion mounted in a vertical bearing in said base, a horizontal bearing carried by the upright portion of the standard, a spindle in the horizontal bearing, means on the spindle for clamping a wheel thereon, an air motor on the spindle for rotating the same, a conduit extending along the upright portion of the standard for supplying air to the motor, and a flexible hose adapted to supply air to the conduit.

11. A balance tester for automobile wheels comprising a rotatable spindle, means for clamping the wheel individually thereon, and a support for the spindle mounted to oscillate about a vertical axis all portions of which are fixed and which extends transversely of the spindle axis.

12. An apparatus for testing the balance of a vehicle wheel, comprising means for supporting the wheel so that it may rotate freely with its normal turning axis disposed substantially horizontally, whereby the wheel may be tested for static balance by gravity, said means also supporting the wheel for free oscillation about a wholly fixed substantially vertical axis approximately intersecting the axis of the wheel, whereby when the wheel is spun it is caused to oscillate if unbalanced dynamically so that it may be marked in its unbalanced region.

WILLIAM A. CATALANO.